W. H. KEMPTON.
MOLDED TUBE.
APPLICATION FILED APR. 16, 1918.
1,400,078.
Patented Dec. 13, 1921.
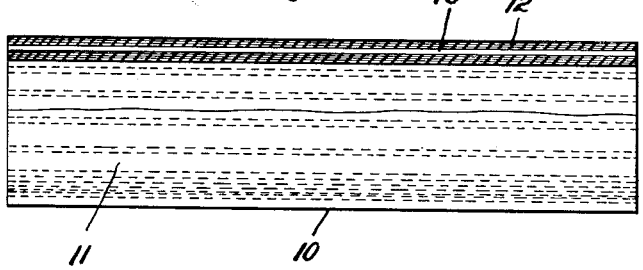
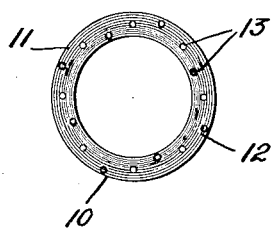
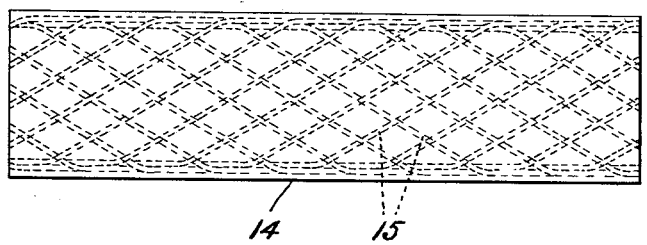
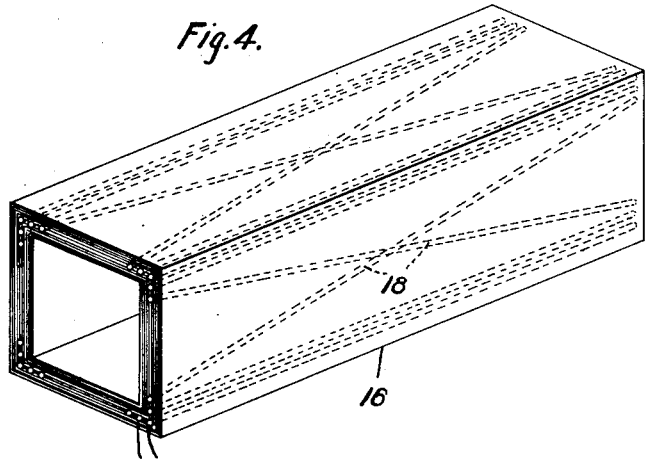
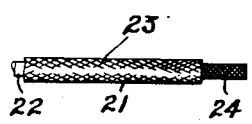
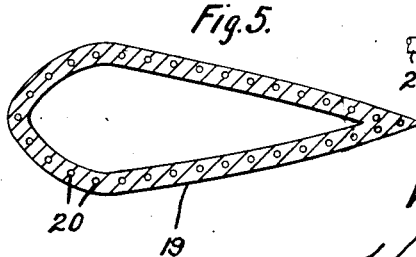
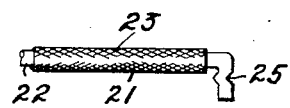
WITNESSES:
Ed. V. Herron
R. J. Fitzgerald
INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED TUBE.

1,400,078.  Specification of Letters Patent.  Patented Dec. 13, 1921.

Application filed April 16, 1918. Serial No. 228,820.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molded Tubes, of which the following is a specification.

My invention relates to molded tubular structures and more particularly to reinforced tubular elements which may be employed in constructing aircraft and for other purposes, the primary object of my invention being the provision of a molded tubular element comprising a tubular body of wound fibrous sheet material impregnated with a suitable binder and having properly disposed reinforcing elements or strands such as wires or cords, interspersed between the several layers of the sheet material.

Another object which I have in view is the construction of elements of the above described character which may be employed as struts, beams, stream-linings and similar parts of frames of aircraft and in which the reinforcing wires or cords may be variously disposed to withstand different forms of stress and strain.

Heretofore, tubular elements of a somewhat similar character have been made by winding fibrous sheet material, such as paper or woven fabric, impregnated with a suitable adhesive or binder, such as shellac, copal, casein or a phenolic condensation product, such as bakelite, into any desired tubular shape and then hardening the adhesive or binder in a proper manner, either with or without subjecting the article to pressure in a mold.

Such tubular structures, while efficient for many purposes, required relatively thick walls, to insure sufficient strength, and as a result were quite heavy for use in aircraft manufacture. I have found that, by reinforcing the walls of such tubular structures by wires of steel or other suitable material, properly disposed and embedded in the bodies of the tubes, by interposing them between adjacent layers of the sheet material during winding of the tubes, tubular structures of unprecedented strength may be formed, having relatively thin walls. Furthermore, experience has shown me that the weight of the reinforcing wire or cord employed is materially less than the weight of other material which may be omitted, as not necessary for strength, when the walls are suitably reinforced.

To insure a clear and accurate understanding of my invention, I have illustrated several forms of tubular elements constructed in accordance with this disclosure.

In the drawings, Figure 1 is an elevation, partially in section, of a tubular structural element of circular cross section; Fig. 2 is an end view of the same element; Fig. 3 is an elevation of an element corresponding to that shown in Fig. 1 but illustrating, in dotted lines, a different disposition of the reinforcing elements; Fig. 4 is a perspective view of a tubular beam showing one means of reinforcing it; Fig. 5 is an end view of a tubular stream-lining constructed in accordance with my invention, and Figs. 6 and 7 are fragmentary elevations of reinforcing wires or cords showing how their ends may be treated to insure their being firmly anchored in place.

In practising my invention, I may wind a sheet of suitably impregnated fibrous sheet material about a mandrel, of the desired cross sectional size and shape, until a sufficient number of layers has been superimposed to provide tubular walls of the desired thickness. During this winding, I interpose, at intervals, between the various layers of the wound sheet, suitable reinforcing elements which may be disposed at various desirable positions and extended in different suitable directions, depending upon the type of reinforcement to be furnished. The body thus wound, while preferably still upon its mandrel, may then be cured in a proper manner, depending upon the type of adhesive or binder employed in impregnating the sheet material.

Although any fibrous sheet materials desired may be employed, I prefer to use either a woven fabric material, such as duck, a matted calendered material, such as paper, or a loosely matted, spinnable, fibrous material, such as cotton batting. Various adhesives or binders may be employed as the impregnating agent of the selected sheet material, but I have found that a phenolic condensation product, such as bakelite, is very desirable because of the extreme strength of the resultant products, the fact that the surfaces of the elements formed are provided with a smooth finish by the ordinary molding process and because the resultant structural element is substantially heat, water, acid and oil proof.

As reinforcing elements, I preferably employ relatively light wires of steel or other suitable materials and the ends of the wires are preferably roughened or distorted to insure a firm anchoring of the wire reinforcing elements between the layers of the wound sheet material. Furthermore, to insure a firm adhesion between the sheet material and wires, the latter may be provided with a fibrous covering of suitable character which may or may not be initially impregnated with the binder with which the sheet material is treated.

In Figs. 1 and 2 of the drawings, I have illustrated a tubular structural element, such as may be employed, for struts of aircraft. This element 10, is circular in cross section and its wall 11 comprises a plurality of superimposed layers or laminations 12 of suitably impregnated fibrous sheet material, closely wound upon each other, a suitable number of reinforcing wires, or other elements 13, being interposed at spaced intervals throughout the circumference of the wall between various layers of the sheet material. These reinforcing elements are laid in as the tube is being wound and are preferably disposed to lie between various layers of sheet material in order that there shall not be enough reinforcing elements, between any two adjacent layers, to in any way, interfere with suitable adhesion between such layers.

After the tube has been thus wound, it is cured in any suitable manner, dependent upon the type of the adhesive employed. For instance, if a phenolic condensation product has been used as a binder, the tube, while still on its mandrel, may be placed in a suitable mold and subjected to heat and pressure in such manner that the heat will first soften and subsequently harden the phenolic condensation product so that the wall of the tube will be strongly compacted and rendered homogeneous throughout its extent. In the structure shown in Figs. 1 and 2, the reinforcing elements are uniformly spaced circumferentially of the element and extend longitudinally thereof in parallel relation to each other. Obviously, if the strain exerted against the element is to be exerted against one particular side thereof, a correspondingly unequal distribution of the reinforcing elements may be had to withstand the particular strain to be met.

In Fig. 3 is shown another form of tubular strut or element, similar to that shown in Figs. 1 and 2, that comprises a tubular body 14 which may be circular in cross section and may be formed in the same manner as the tubular element previously described, with the exception that the wire reinforcing elements 15, which are laid between adjacent laminations of the sheet material, are disposed in the form of helices as clearly indicated in dotted lines.

In Fig. 4 of the drawings, is disclosed one form of hollow beam which may be employed for various purposes, both in aircraft and other structures. This beam, which is shown as square in cross section, may, of course, be of any desired cross sectional shape which provides a plurality of plain surfaced walls or faces. The method employed in constructing the body of the beam 16 may be the same as that previously described, the sheet material being wound, either about a mandrel of the proper cross sectional shape, or about a cylindrical mandrel of proper dimensions and circumference from which it may be removed, softened and then slipped upon a forming mandrel of proper cross sectional shape for molding. During the winding, the reinforcing elements or wires are inserted between the several laminations of sheet material at the desired positions; for instance, a group of reinforcing elements 17 may be positioned at each corner formed by the walls of the tubular beam to extend parallel to the faces thereof and, in some instances, additional reinforcing elements 18 may be interposed between the laminations constituting the walls, to extend diagonally of the various faces, each pair of such diagonally extending elements crossing each other, usually at a central point of the wall in which they are embedded.

In Fig. 5 of the drawings, is illustrated a tubular stream-lining 19 of suitable streamline cross sectional shape which may be formed in the general manner previously described, the reinforcing wires or elements 20 being disposed between the several layers or laminations of the fibrous sheet material constituting the wall during the winding of such sheet material. This sheet material may be wound upon a mandrel of streamline cross sectional shape or upon a cylindrical mandrel from which the built-up body is subsequently removed and placed upon a proper shaping mandrel for molding. The reinforcing elements 20 preferably extend longitudinally of the wall of the tubular stream-lining and in parallel relation to each other. In the drawing, they are shown as spaced uniformly but, in many instances, the reinforcing elements may be grouped largely or entirely in the leading portion or edge of the stream-lining, that is, at the wider portion thereof, as this is the part of the stream-lining subjected to the greatest strain.

Although I prefer to employ a steel wire having a fibrous covering, wires of other metals, with or without covering, or strong cords, such as linen, may be employed. A preferred form of reinforcing element or wire is that shown at 21 in Figs. 6 and 7 in which a wire of steel 22, or other suitable material, is provided with a fibrous covering 23 of cotton or other material, wound or woven about it. The fibrous covering of these reinforcing elements, previous to their being used, may be impregnated with a binder of the type with which the sheet material has been treated, although this is not essential, as such impregnation will occur during curing of the built-up element. In order to insure firm anchoring of the reinforcing elements, and particularly of their ends, the ends of the wire are preferably roughened or corrugated, as shown at 24 in Fig. 6 or distorted, as shown at 25 in Fig. 7.

It will be obvious, from the various tubular structural elements illustrated, because of the different sheet materials and binders which may be employed and because of the different arrangements of reinforcing elements which may be desirable, that my invention is susceptible of numerous changes and alterations, both in form, in materials employed and in arrangement of parts. For these reasons, no limitations, other than those set forth in the claims, are to be imposed upon my invention.

I claim as my invention:

1. A reinforced tubular article including a tubular body formed of superimposed layers of fibrous sheet material secured by a binder and a plurality of reinforcing wires provided with a binder-impregnated fibrous covering interposed between the layers of the body.

2. A reinforced tubular article including a tubular body formed of spirally wound fibrous sheet material impregnated and bound together by a hardened phenolic condensation product and a plurality of reinforcing wires interposed between certain of the layers of the sheet material and provided with fibrous coverings.

3. A reinforced article comprising a tubular body of fibrous sheet material associated with a heat-hardened phenolic condensation product and interposed reinforcing wires, each provided with a covering of fibrous material associated with a phenolic condensation product disposed at intervals within the body.

4. A reinforced article comprising a body of fibrous material associated with a heat-hardened binder and reinforcing wires, each provided with a covering of fibrous material, disposed therein.

5. A reinforced article comprising superimposed layers of sheet material impregnated with a hardened binder and interposed reinforcing wires, each provided with a covering of fibrous material, disposed at intervals within the body.

6. A reinforced article comprising superimposed layers of fibrous sheet material impregnated with a heat-hardened phenolic condensation product and interposed reinforcing wires, each provided with a covering of fibrous material impregnated with a phenolic condensation product, disposed at intervals within the body.

7. A reinforced tubular article including a tubular body formed of superimposed layers of fibrous sheet material associated with a hardened binder and a plurality of reinforcing wires disposed between different convolutions of the tubular body.

8. A reinforced tubular article including a tubular body formed of superimposed layers of fibrous sheet material impregnated with a hardened phenolic condensation product and a plurality of reinforcing wires disposed between different convolutions of the sheet material forming the tubular body.

In testimony whereof, I have hereunto subscribed my name this 5th day of April, 1918.

WILLARD H. KEMPTON.